United States Patent
Stark

(10) Patent No.: US 8,524,849 B2
(45) Date of Patent: Sep. 3, 2013

(54) HYDROPHILIC ORGANOFUNCTIONAL SILICONE COPOLYMERS

(75) Inventor: Kurt Stark, Neuhaus (DE)

(73) Assignee: Wacker Chemie AG, Munich (DE)

( * ) Notice: Subject to any disclaimer, the term of this patent is extended or adjusted under 35 U.S.C. 154(b) by 65 days.

(21) Appl. No.: 13/029,145

(22) Filed: Feb. 17, 2011

(65) Prior Publication Data

US 2011/0163254 A1    Jul. 7, 2011

Related U.S. Application Data

(63) Continuation of application No. 12/065,788, filed as application No. PCT/EP2006/065802 on Aug. 30, 2006, now abandoned.

(30) Foreign Application Priority Data

Sep. 8, 2005 (DE) .......... 10 2005 042 752

(51) Int. Cl.
- *C08G 77/20* (2006.01)
- *C08F 30/08* (2006.01)
- *C08F 130/08* (2006.01)
- *C08F 230/08* (2006.01)
- *C08F 116/20* (2006.01)
- *C08F 116/12* (2006.01)
- *C08F 16/16* (2006.01)
- *C08L 43/04* (2006.01)
- *C08L 83/07* (2006.01)

(52) U.S. Cl.
USPC ............ 528/32; 524/547; 524/588; 526/279; 526/332; 526/333; 526/334

(58) Field of Classification Search
USPC ............ 524/547, 588; 526/279, 332, 333, 526/334; 528/32
See application file for complete search history.

(56) References Cited

U.S. PATENT DOCUMENTS

| | | | |
|---|---|---|---|
| 4,711,943 A | 12/1987 | Harvey, III | |
| 5,336,797 A * | 8/1994 | McGee et al. | 556/419 |
| 5,648,402 A | 7/1997 | Nunez et al. | |
| 6,403,074 B1 | 6/2002 | Blankenburg et al. | |
| 2003/0180245 A1 | 9/2003 | Gotsche et al. | |
| 2004/0041287 A1 | 3/2004 | Engardio et al. | |
| 2005/0159502 A1 | 7/2005 | Steffen et al. | |

FOREIGN PATENT DOCUMENTS

| | | |
|---|---|---|
| DE | 19942565 A1 | 3/2001 |
| DE | 10020670 A1 | 8/2001 |
| DE | 10332527 A1 | 2/2005 |
| EP | 0614924 A1 | 9/1994 |
| EP | 1097701 A1 | 5/2001 |
| EP | 1284282 A1 | 2/2003 |
| JP | 05-230161 A | 9/1993 |
| JP | 05230161 A * | 9/1993 |
| JP | 2002-11338 A | 1/2002 |
| JP | 2003147085 A | 5/2003 |
| JP | 2005146217 A | 6/2005 |
| WO | 99/10412 A1 | 3/1999 |
| WO | 02/15853 A1 | 2/2002 |

OTHER PUBLICATIONS

English Translation of JP 05-230161 A; Ono; Sep. 1993.*
Patent Abstract of Japan corresponding to JP 2000044639 A.
Patent Abstract corresponding to DE 10020670 A1.
Patent Abstract corresponding to DE 10332527 A1.
Patent Abstract corresponding to DE 19942565 A1.
Patent Abstract corresponding to EP 1097701 A1.
Patent Abstract corresponding to EP 1284282 A1.

* cited by examiner

*Primary Examiner* — Karuna P Reddy
(74) *Attorney, Agent, or Firm* — Brooks Kushman P.C.

(57) ABSTRACT

Hydrophilic silicone copolymers are the addition polymerization product of an unsaturated silicone macromer, and unsaturated polyoxyalkylene polyether, and optionally further unsaturated addition polymerizable monomers.

7 Claims, No Drawings

US 8,524,849 B2

HYDROPHILIC ORGANOFUNCTIONAL SILICONE COPOLYMERS

CROSS-REFERENCE TO RELATED APPLICATION

This application is a continuation of U.S. application Ser. No. 12/065,788, filed Mar. 5, 2008, now abandoned, which is the U.S. national phase of PCT Appln. No. PCT/EP2006/065802 filed Aug. 30, 2006 which claims priority to German application DE 10 2005 042 752.9 filed Sep. 8, 2005, to which priority to all are hereby claimed.

BACKGROUND OF THE INVENTION

1. Field of the Invention

The invention relates to hydrophilic organofunctional silicone copolymers, a process for the preparation thereof and the use thereof.

2. Description of the Related Art

Hydrophilic organofunctional silicone copolymers are silicone polyethers, i.e. polysiloxanes modified with polyalkylene oxides. Such products are used in cosmetics as dimethicone copolyols, as a protective colloid and emulsifier, as an antifoam or in the finishing of textiles as hydrophilic softeners.

The prior art to date regarding the preparation of such compounds is to subject H-siloxanes to hydrosilylation with unsaturated polyethers (polyalkylene oxides). The presence of a platinum catalyst is required for this purpose, which, however, introduces heavy metals into the end product. A further disadvantage of this reaction is the insufficient linkage of the unsaturated polyether to the silicone chain, so that free polyether is still present in the product even after the reaction. The linkage is to some extent satisfactorily possible only when the unsaturated polyether has allyl groups, but this results in undesired rearrangement reactions and in the formation of byproducts. It is therefore generally necessary to employ an excess of allylpolyether. Vinyl or (meth)acryloyl groups lead to even poorer linkage. In the case of acryloyl or methacryloyl functions, 1,4-addition and the formation of an unstable Si—O—C bond, i.e. a very labile and virtually unstable linkage, very frequently results. These insufficient linkages can lead to inhomogeneities of the product, e.g. phase separation, and to negative properties during the use thereof.

DE 10020670 A1 describes organosiloxanyl derivatives which have been modified with polyalkylene glycol and are obtained by means of hydrosilylation of H-siloxanes with a vinyl-functional polyalkylene oxide. EP 1097701 A1 and EP 1284282 A1 disclose polyoxyalkylene-polysiloxane copolymers which are obtained by means of hydrosilylation of H-siloxanes with unsaturated polyethers in the presence of a metal catalyst and are used as an emulsifier or antifoam. WO 99/10412 A1 relates to polysiloxane-polyalkylene oxide block copolymers which are obtainable by means of hydrosilylation. WO 02/15853 A1 describes the use of vinyl ester copolymers in cosmetic hair formulations, the polymerization of the vinyl ester being effected in the presence of polyether-containing compounds which may contain silicone moieties. JP 2000-044639 relates to the preparation of aqueous synthetic resin emulsions for coating materials and adhesives, ethylenically unsaturated monomers being polymerized in an aqueous medium in the presence of a macromonomer which is obtained by reaction of a silicone having a terminal unsaturated group and a polyalkylene glycol (meth) acrylate.

SUMMARY OF THE INVENTION

It was the object to provide hydrophilic organofunctional silicone copolymers in a simple manner, which are distinguished by stable and complete bonding of the hydrophilic moiety to the silicone moiety. These and other objects are attained by reaction of unsaturated polyethers and unsaturated organosilicon compounds in the presence of a free radical polymerization initiator.

DETAILED DESCRIPTION OF THE PREFERRED EMBODIMENTS

The invention thus relates to hydrophilic organofunctional silicone copolymers obtainable by means of free radical polymerization, in the absence of a solvent or in solution, of one or more silicone macromers having in each case at least one unsaturated group with one or more polyethers having in each case at least one unsaturated group, and optionally one or more ethylenically unsaturated comonomers.

The invention furthermore relates to a process for the preparation of hydrophilic organofunctional silicone copolymers by means of free radical polymerization in the absence of a solvent or in solution, of one or more silicone macromers having in each case at least one unsaturated group and one or more polyethers having in each case at least one unsaturated group and optionally one or more ethylenically unsaturated comonomers.

Silicone macromers suitable for the preparation of the hydrophilic organofunctional silicone copolymers are linear, branched, cyclic and three-dimensionally crosslinked polysiloxanes having at least 5 repeating siloxane units and having at least one functional group capable of free radical polymerization. Preferably, the chain length is from 5 to 10,000 repeating siloxane units. Ethylenically unsaturated groups, such as alkenyl groups, are preferred as polymerizable, functional groups.

Preferred silicone macromers are silicones having the general formula $R^1_a R_{3-a} SiO(SiR_2O)_n SiR_{3-a} R^1_a$, in which R is identical or different and is a monovalent, optionally substituted alkyl radical or alkoxy radical having in each case 1 to 18 C atoms, $R^1$ is a polymerizable group, a is 0 or 1, at least one a being 1, and n is from 5 to 10,000.

In the general formula $R^1_a R_{3-a} SiO(SiR_2O)_n SiR_{3-a} R^1_a$ examples of radicals R are the methyl, ethyl, n-propyl, isopropyl, 1-n-butyl, 2-n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; and cycloalkyl radicals such as cyclopentyl, cyclohexyl, cycloheptyl and methylcyclohexyl radicals. The radical R is preferably a monovalent hydrocarbon radical having 1 to 6 carbon atoms, such as the methyl, ethyl, n-propyl, isopropyl, n-butyl, sec-butyl, amyl and hexyl radicals, the methyl radical being particularly preferred.

Preferred alkoxy radicals R are those having 1 to 6 carbon atoms, such as the methoxy, ethoxy, propoxy and n-butoxy radicals, which may optionally be substituted by oxyalkylene radicals, such as oxyethylene or oxymethylene radicals. The methoxy and ethoxy radicals are particularly preferred. The alkyl radicals and alkoxy radicals R can optionally be substituted, for example by halogen, mercapto groups, epoxy functional groups, carboxyl groups, keto groups, enamine groups, amino groups, aminoethylamino groups, isocyanato groups, aryloxy groups, alkoxysilyl groups and hydroxyl groups.

Suitable polymerizable groups $R^1$ are alkenyl radicals having 2 to 8 C atoms. Examples of such polymerizable groups are the vinyl, allyl, butenyl, styryl and acryloyloxyalkyl and methacryloyloxyalkyl groups, the alkyl radicals containing 1 to 4 C atoms. The vinyl group, 3-methacryloyloxypropyl, 3-acryloyloxypropyl, methacryloyloxymethyl and acryloyloxymethyl groups are preferred.

$\alpha,\omega$-Divinylpolydimethylsiloxanes, $\alpha,\omega$-di(3-acryloyloxypropyl)polydimethylsiloxanes, $\alpha,\omega$-di(3-methacryloyloxypropyl)polydimethylsiloxanes, $\alpha,\omega$-di(acryloyloxy-methyl)polydimethylsiloxanes, $\alpha,\omega$-di(methacryloyloxymethyl)polydimethylsiloxanes are preferred. In the case of the silicones only monosubstituted by unsaturated groups, $\alpha$-monovinylpolydimethylsiloxanes, $\alpha$-mono(3-acryloyloxypropyl)polydimethylsiloxanes, $\alpha$-mono(acryloyloxymethyl)polydimethylsiloxanes, and $\alpha$-mono(3-methacryloyl-oxypropyl)polydimethylsiloxanes are preferred. In the case of the monofunctional polydimethylsiloxanes, an alkyl or alkoxy radical, for example a methyl or butyl or methoxy radical is preferably present at the other chain end. The polymerizable silicon macromers as described in EP-A-614924 are also suitable. $\alpha,\omega$-Divinylpolydimethylsiloxanes, $\alpha$-mono(3-methacryloyloxypropyl)polydimethylsiloxanes, $\alpha,\omega$-di(3-acryloyloxypropyl)poly-dimethylsiloxanes, and $\alpha,\omega$-di(3-methacryloxloxypropyl) polydimethylsiloxanes are most preferred as silicone macromers.

Polyalkylene oxides which have at least 3 repeating units and one or more alkenyl groups suitable for polymerization are suitable as unsaturated polyethers. The unsaturated group may be a vinyl, allyl, styryl, methacryloyl or acryloyl group and is preferably at the chain end. The hydrophilic alkylene oxide units in the polyether are those having 1 to 8 C atoms and may be identical or different and may be distributed randomly or blockwise. Preferred alkylene oxide units are ethylene oxide, propylene oxide and butylene oxide, and ethylene oxide, propylene oxide and mixtures thereof are particularly preferred. Chain lengths of from 3 to 1000 repeating units are preferred. $\alpha,\omega$-Divinylpolyethers, $\alpha,\omega$-diallylpolyethers and $\alpha,\omega$-di(meth)acryloylpolyethers are suitable. In the case of the polyethers only monosubstituted by unsaturated groups, $\alpha$-monovinylpolyethers, $\alpha$-monoallylpolyethers, $\alpha$-mono(meth)acryloylpolyethers are preferred. In the case of the monofunctional polyethers, an alkyl radical having 1 to 6 C atoms or a hydroxyl group is preferably at the other chain end.

Polyoxyethylene glycol divinyl ether, polyoxyethylene glycol diallyl ether, polyoxypropylene glycol divinyl ether, polyoxypropylene glycol diallyl ether, polyoxyethylene glycol di(meth)acrylate, polyoxypropylene glycol di(meth)acrylate, polyoxyethylene glycol monovinyl ether, polyoxyethylene glycol monoallyl ether, polyoxyethylene glycol monoacrylate, polyoxyethylene glycol monomethacrylate, polyoxypropylene glycol monoacrylate, polyoxypropylene glycol monoacrylate, polyoxypropylene glycol monomethacrylate, polyethylene glycol polypropylene polyoxyethylenepolyoxypropylene glycol monovinyl ether, polyethylene glycol polypropylene polyoxyethylenepolyoxypropylene glycol monoallyl ether, polyethylene glycol polypropylene polyoxyethylenepolyoxypropylene glycol monoacrylate or polyethylene glycol polypropylene poly-oxyethylenepolyoxypropylene glycol monomethacrylate are most preferred as unsaturated polyethers.

One or more comonomers from the group consisting of vinyl esters of straight-chain or branched alkylcarboxylic acids having 1 to 15 C atoms, (meth)acrylates of alcohols having 1 to 15 C atoms, (meth)acrylamides, vinylaromatics, olefins, dienes, vinyl halides, vinyl ketones, vinyl ethers, polymerizable silanes, unsaturated mono- and dicarboxylic acids or salts thereof, ethylenically unsaturated carboxamides and carbonitriles, mono- and diesters of fumaric and maleic acid, ethylenically unsaturated sulfonic acids or salts thereof, ethylenically unsaturated phosphorus-containing monomers and cationic monomers are suitable as ethylenically unsaturated comonomers.

Suitable vinyl esters are vinyl esters of straight-chain or branched carboxylic acids having 1 to 15 C atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of $\alpha$-branched monocarboxylic acids having 5 to 13 C atoms, for example VeoVa9$^R$ or VeoVa10$^R$ (trade names of Resolution Performance Products). Vinyl acetate is particularly preferred.

Suitable comonomers from the group consisting of the esters of acrylic acid or methacrylic acid are esters of straight-chain or branched alcohols having 1 to 15 C atoms. Preferred methacrylates or acrylates are methyl acrylate, methyl methacrylate, ethyl acrylate, ethyl methacrylate, propyl acrylate, propyl methacrylate, n-, iso- and tert-butyl acrylate, n-, iso- and tert-butyl methacrylate, 2-ethylhexyl acrylate and norbornyl acrylate. Methyl acrylate, methyl methacrylate, n-, iso- and tert-butyl acrylate, 2-ethylhexyl acrylate and norbornyl acrylate are particularly preferred.

Suitable dienes are 1,3-butadiene and isoprene. Examples of copolymerizable olefins are ethene and propene. Styrene and vinyltoluene can be copolymerized as vinylaromatics. From the group consisting of the vinyl halides, vinyl chloride, vinylidine chloride or vinyl fluoride are usually used, preferably vinyl chloride.

Suitable ethylenically unsaturated mono- and dicarboxylic acids or salts thereof are, for example, crotonic acid, itaconic acid, acrylic acid, methacrylic acid, fumaric acid and maleic acid. Suitable ethylenically unsaturated carboxamides and carbonitriles are acrylamide and acrylonitrile. Diethyl and diisopropyl esters and maleic anhydride can be used as mono- and diesters of fumaric acid and maleic acid. Ethylenically unsaturated sulfonic acids and salts thereof are preferably vinylsulfonic acid and 2-acrylamido-2-methylpropanesulfonic acid. Vinyl phosphonate can be used as an ethylenically unsaturated phosphorus-containing monomer. For example, diallyldimethylammonium chloride (DADMAC), 3-trimethylammoniumpropyl (meth)acrylamide chloride (MAPTAC) and 2-trimethylammoniumethyl (meth)acrylate chloride are used as cationic comonomers.

Suitable polymerizable silanes are $\gamma$-acryloyl- and $\gamma$-methacryloyloxypropyltri(alkoxy)silanes, $\alpha$-(meth)acryloyloxymethyltri(alkoxy)silanes, $\gamma$-(meth)acryloyloxypropylmethyldi(alkoxy)silanes, vinylalkyldi(alkoxy)silanes and vinyltri(alkoxy)silanes, it being possible to use, for example, methoxy, ethoxy, methoxyethylene, ethoxyethylene, methoxypropylene glycol ether and ethoxypropylene glycol ether radicals as alkoxy groups. Examples of these are vinyltrimethoxysilane, vinyltriethoxysilane, vinyltripropoxysilane, vinyltriisopropoxysilane, vinyltris(1-methoxy) isopropoxysilane, vinyltributoxysilane, vinyltriacetoxysilane, 3-methacryloyloxypropyltrimethoxysilane, 3-methacryloyloxypropylmethyldimethoxysilane, methacryloyloxymethyltrimethoxysilane, 3-methacryloyloxypropyltris(2-methoxyethoxy)silane, vinyltrichorosilane, vinylmethyldichlorosilane, vinyltris(2-methoxyethoxy)silane, trisacetoxyvinylsilane and 3-(triethoxysilyl)propyl(succinic anhydride)silane.

Further suitable comonomers are functionalized (meth) acrylates and functionalized allyl or vinyl ethers, in particular epoxy-functional comonomers, such as glycidyl acrylate, glycidyl methacrylate, allyl glycidyl ether or vinyl glycidyl ether, or hydroxyalkyl-functional comonomers, such as hydroxyethyl (meth)acrylate, substituted or unsubstituted aminoalkyl (meth)acrylates, or cyclic monomers such as N-vinylpyrrolidone; or N-vinylformamide or N-vinylacetamide.

Further examples of suitable comonomers are pre-crosslinking comonomers such as polyethylenically unsaturated comonomers, for example divinyl adipate, divinylbenzene, diallyl maleate, allyl methacrylate, butanediol diacrylate or triallyl cyanurate, or post-crosslinking comonomers, for example acrylamidoglycolic acid (AGA), methyl methylacrylamido-glycolate (MAGME), N-methylol acrylamide (NMA), N-methylol-methacrylamide, N-methylolallyl carbamate, alkyl ethers, such as the isobutoxy ether or ester of N-methylolacrylamide, of N-methylolmethacrylamide or of N-methylolallyl carbamate.

Use of abovementioned organic comonomers leads to a multiplicity of positive properties. Thus, owing to their high mobility, they act as effective additional bridging aids in the coupling between the silicone macromer and the unsaturated polyether. Moreover, the hydrophilic and hydrophobic properties of the organofunctional silicone copolymer can additionally be controlled by the choice of certain comonomers. It is also possible to introduce (both anionic and cationic) charges into the hydrophilic organofunctional silicone copolymer through the organic comonomers. Furthermore, by the introduction and use of comonomers, the adhesion to the substrates is substantially increased, particularly if the monomers have functional groups. If comonomers which carry different functional groups which can react with one another and form a bond are used, the hydrophilic organofunctional silicone copolymer can also be crosslinked. This has the advantages that the strength can be increased and, on use in the textile sector, it is also possible to obtain, for example, high permanence to washing. The use of organic comonomers in addition to the silicone macromers and the unsaturated hydrophilic polyethers is therefore very advisable.

In general, from 1 to 99% by weight, preferably from 5 to 60% by weight, particularly most preferably from 10 to 45% by weight, of silicone macromer are copolymerized. In general from 1 to 99% by weight, preferably from 30 to 90% by weight, particularly more preferably from 50 to 80% by weight, of unsaturated polyether are copolymerized. In general, from 0 to 98% by weight, preferably from 5 to 50% by weight, and particularly most preferably from 10 to 30% by weight, of ethylenically unsaturated monomer are copolymerized. The data in % by weight are based in each case on the total weight of the monomers: silicone macromer, unsaturated polyether, ethylenically unsaturated monomer, and in each case sum to total 100% by weight.

The hydrophilic organofunctional silicone copolymers are prepared by means of polymerization in the absence of a solvent or in a solvent, in the presence of free radical initiators. The polymerization temperature is in general from 20° C. to 150° C., preferably from 40° C. to 90° C. In general, polymerization is effected at atmospheric pressure. In the copolymerization of monomers which are gaseous at room temperature, such as ethylene, the procedure is carried out under pressure, in general from 1 to 100 bar. In general, the polymerization is carried out up to a solids content of from 10 to 100%, preferably up to a solids content of from 20 to 60%.

Suitable free radical initiators are oil-soluble initiators, such as tert-butyl peroxy-2-ethylhexanoate, tert-butyl peroxypivalate, tert-butyl peroxyneodecanoate, dibenzoyl peroxide, tert-amyl peroxypivalate, di(2-ethylhexyl) peroxydicarbonate, 1,1-bis(tert-butylperoxy)-3,3,5-trimethylcyclohexane and di(4-tert-butylcyclohexyl) peroxydicarbonate. Azo initiators, such as azobisisobutyronitrile, are also suitable. The initiators are generally used in an amount of from 0.005 to 5.0% by weight, preferably from 0.1 to 3.0% by weight, based on total monomer.

The adjustment of the molecular weight and of the degree of polymerization is known to the person skilled in the art. This can be effected, for example, by addition of regulators, by the solvent content, by variation of the initiator concentration, and by variation of the temperature. Regulators or chain-transfer agents are, for example, acetaldehyde, butyraldehyde or compounds containing mercapto groups, such as dodecyl mercaptan.

Suitable organic solvents are, for example, tetrahydrofuran (THF), chloroform, petroleum ether, heptane, cyclohexane, ethyl acetate, methyl acetate, isopropanol, ethanol, methanol, tert-butanol, acetone, toluene, benzene, methyl ethyl ketone, diethyl ether or p-dioxane. Another suitable solvent is water, but only as a mixture with suitable organic solvents. The abovementioned solvents can be used alone or as mixtures with various ratios for the polymerization. Preferred solvents are ethyl acetate, methyl acetate, acetone, methyl ethyl ketone, ethanol and isopropanol. Solvent mixtures with isopropanol are particularly preferred; a mixture of ethyl acetate and isopropanol is most preferred.

The polymerization can be carried out by initially introducing all or individual constituents of the reaction mixture or by partly initially introducing and subsequently metering the individual constituents of the reaction mixture, or by the metering method without initial introduction. In a preferred procedure, from 3 to 40% by weight, based on the total weight of the monomers, of a mixture of the monomers a) (silicone macromer), b) (unsaturated polyether) and optionally c) (organic monomer) are initially introduced in the desired ratios and the remainder of the remaining monomers a), b) and optionally c) are metered in as a mixture. It is furthermore preferable initially to initially introduce a portion of the initiator, preferably from 3 to 50% by weight of total initiator, and to meter in the remainder. Most preferably, the monomers a), b) and optionally c) are added so that their ratio always remains constant at any time during the polymerization.

After the end of the polymerization, postpolymerization can be effected for removal of residual monomers, using known methods. Volatile residual monomers and further volatile constituents can also be removed by means of distillation, preferably under reduced pressure.

The working-up of the hydrophilic organofunctional silicone copolymers is effected according to composition and hence according to their properties. The hydrophilic organofunctional silicone copolymers can be isolated as a neat system, i.e. the total solvent is removed. It is also possible to use the hydrophilic organofunctional silicone copolymers in solution. In this case, either the solvent (or solvent mixture) used for the polymerization can be used or an exchange of solvent can take place. The latter variant is preferred, for example, in the case of water-soluble or water-dispersible hydrophilic organofunctional silicone copolymers. Here, the organic solvent is distilled off and gradually replaced by water until the total solvent has been exchanged for water.

Owing to the wide range of possibilities for the composition of the hydrophilic organofunctional silicone copolymers according to the invention and their unique combination of hydrophilic polyether blocks in addition to hydrophobic silicone chains, these products are suitable for very many applications.

The hydrophilic organofunctional silicone copolymers are used as dispersants and emulsifiers; preferably as stabilizers or protective colloids. Thus, for example, silicone oil emulsions can be stabilized therewith, or the stability of polyurethane foams is dramatically increased therewith. In the case of emulsion polymerization, too, the hydrophilic organofunctional silicone copolymers can be added as a stabilizer or protective colloid.

The hydrophilic organofunctional silicone copolymers are also suitable as a constituent or additive for cosmetics, such as hairsprays, creams, lotions, gels, hair conditioner or hair setting composition.

The hydrophilic organofunctional silicone copolymers are furthermore suitable as release agents and coating materials, for example for the production of abhesive (non-tacky) coverings in the release coating sector. They are also suitable for the coating of textile, paper, wood, plastics or sheets and metals, for example as a protective coating or as an antifouling coating.

Further fields of use are in the building sector as an additive in cement-containing and non-cement-containing systems and for the protection of structures, in particular for the production of weather-resistant coatings or sealing compounds.

The hydrophilic organofunctional silicone copolymers are very advantageously also used in the polish sector. The hydrophilic organofunctional silicone copolymers are also used as additives in antifoam formulations since—depending on composition—they may have an antifoam effect. In this context, the use of the hydrophilic organofunctional silicone copolymers as antifoams in paints and finishes may also be mentioned. The hydrophilic organofunctional silicone copolymers are—depending on composition and depending on the system where they are used—also very suitable as modifiers, hydrophilizing agents or water repellants.

The hydrophilic organofunctional silicone copolymers are, however, particularly suitable as hydrophilizing softeners for textiles. Synthetically produced fibers (such as polyester, polyamide or polyolefin fibers) are often so hydrophobic that no water or no perspiration can be absorbed. This very unpleasant property for the wearer of such textiles can be completely eliminated by treatment of the textile fibers or of the textiles with the hydrophilic organofunctional silicone copolymers according to the invention. The textiles are rendered hydrophilic thereby, perspiration can be absorbed and furthermore the textiles acquire a pleasant soft handle. The hydrophilic organofunctional silicone copolymers are also suitable as an anti-wrinkling agent in the textile sector, i.e. the wrinkling of the textiles is avoided thereby. The hydrophilic organofunctional silicone copolymers are recommended for the treatment of paper, for example in the tissue sector, where they ensure a soft effect on a paper tissue.

The following examples serve for further explanation of the invention without limiting it in any way:

EXAMPLE 1

1100.00 g of ethyl acetate, 176.51 g of isopropanol, 22.89 g of polyethylene glycol polypropylene glycol polyoxyethylenepolyoxypropylene glycol monomethacrylate having 20 EO units and 20 PO units, 17.17 g of methyl acrylate and 17.17 g of α,ω-di(3-methacryloyloxypropyl)polydimethylsiloxane having a chain length (number of $SiOMe_2$ repeating units) of 135 and 3.05 g of PPV (tert-butyl perpivalate, 75% strength solution in aliphatics) were initially introduced into a 3 l glass pot having an anchor stirrer, reflux condenser and metering apparatuses. The initially introduced mixture was then heated to 70° C. at a stirrer speed of 200 rpm. After the internal temperature of 70° C. had been reached, the metering of initiator (85.83 g of ethyl acetate and 12.21 g of PPV (75% strength solution in aliphatics) was started at a rate of 21.37 ml/h. Ten minutes after the start of the metering of initiator, monomer metering 1 (77.24 g of methyl acrylate and 154.49 g of α,ω-di(3-methacryoyloxypropyl)polydimethylsiloxane having a chain length (number of SiOMe2 repeating units) of 135) was started at a rate of 60.54 ml/h, and monomer metering 2 (205.98 g of polyethylene glycol polypropylene glycol polyoxyethylenepolyoxypropylene glycol monomethacrylate) having 20 EO units and 20 PO units and 77.24 g of methyl acrylate) was started at a rate of 72.26 ml/h. The metering of initiator extended over a period of 310 min and the two monomer meterings ran for 240 minutes (in succession). After the end of the meterings postpolymerization was effected for a further 60 min at 70° C. The polymer solution obtained was then completely evaporated down, i.e. the solvent was completely removed. A hydrophilic organofunctional silicone copolymer remained behind in the form of an almost transparent oil.

Analyses of the hydrophilic organofunctional silicone copolymer (pure form): solids content: 99.9%, viscosity (Höppler, 10% strength solution in ethyl acetate)=2.4 mPa·s, DSC measurement: no melting point/crystallization point, glass transition temperature Tg=−60.4° C.; weight average molecular weight from GPC: $M_w$=133,800 g/mol.

1H-NMR spectroscopy: No free double bonds were detectable. The composition of the hydrophilic organofunctional silicone copolymer determined with the aid of NMR corresponded within the accuracy of measurement to the composition of the starting materials (about 40% by weight proportion of polyether, about 30% by weight proportion of silicone, about 30% by weight proportion of polymethyl acrylate).

Properties of an aqueous solution of the hydrophilic organofunctional silicone copolymer: solids content: 34.22%; colloidal turbid solution; Brookfield viscosity 20 (spindle 2): 83 mPa·s; mean particle size (Nanosizer): 165 nm; Coulter: Dn (number average particle diameter) 0.091 μm; Dv (volume-average particle diameter) 0.145 μm; surface area 47.8 $m^2$; static surface tension σ of a 1% strength aqueous solution: 27.5 mN/m.

EXAMPLE 2

431.47 g of ethyl acetate, 208.00 g of isopropanol, 20.04 g of α,ω-di(3-methacryloyloxypropyl)polydimethylsiloxane having an average chain length of 168, 21.05 g of polyoxyethylene glycol monomethacrylate having 10 EO, 21.05 g of polyoxypropylene glycol monomethacrylate having 9 PO, 14.03 g of hydroxyethyl acrylate (HEA), 4.01 g of glycidyl methacrylate (GMA) and 5.92 g of PPV (75% strength solution in aliphatics) were initially introduced into a stirred 3 l glass pot having an anchor stirrer, reflux condenser and metering apparatuses. The initially introduced mixture was then heated to 70° C. at a stirrer speed of 200 rpm. After the internal temperature of 70° C. had been reached, metering of the initiator (53.87 g of methyl acetate and 22.97 g of PPV (75% strength solution in aliphatics)) was started at a rate of 17.35 ml/h. Ten minutes after the start of the metering of the initiator, the monomer metering (160.52 g of α,ω-di(3-methacryoyloxypropyl)polydimethylsiloxane having an average chain length of 168, 168.55 g of polyoxyethylene glycol monomethacrylate having 10 EO, 168.55 g of polyoxypropylene glycol monomethacrylate having 9 PO, 112.37 g of hydroxyethyl acrylate (HEA) and 32.10 g of glycidyl methacrylate (GMA)) was started at a rate of 160.52 g/h. The metering of initiator extended over a period of 310 minutes, and the monomer metering ran for 240 minutes. After the end of the meterings, postpolymerization was effected for a further 60 minutes at 70° C. The polymer solution obtained was then completely evaporated down, i.e. the solvent was completely removed. A hydrophilic organofunctional silicone copolymer remained behind in the form of an almost transparent oil.

Analyses of the hydrophilic organofunctional silicone copolymer (pure form): Solids content: 99.8%, viscosity (Höppler, 10% strength solution in ethyl acetate)=2.6 mPa·s, DSC measurement: no melting point/crystallization point, glass transition temperature Tg=−40.6° C.; weight average molecular weight from GPC: $M_w$=120,000 g/mol.

1H-NMR spectroscopy: No free double bonds were detectable. The composition of the hydrophilic organofunctional silicone copolymer determined with the aid of NMR corresponded within the accuracy of measurement to the composition of the starting materials.

Properties of an aqueous solution of the hydrophilic organofunctional silicone copolymers: solids content: 30.5%; colloidal slightly turbid solution (almost transparent); Brookfield viscosity 20 (spindle 2): 96 mPa·s; mean particle size (Nanosizer): 121 nm; Coulter: Dn 0.041 µm; Dv 0.105 µm; surface area 69.8 $m^2$;
Static surface tension σ of a 1% strength aqueous solution: 31.8 mN/m.

Remark: The hydrophilic organofunctional silicone copolymer could be very readily dissolved/dispersed in water.

EXAMPLE 3

730.36 g of ethyl acetate, 117.68 g of isopropanol, 152.58 g of polyglycol ether polyoxyalkylene polyether having 20 EO and 20 PO groups and functionalized with a terminal allyl group, 19.07 g of vinyl acetate, 114.43 g of α,ω-divinyl-functionalized polydimethylsiloxane having about 133 SiOMe$_2$ repeating units and 2.03 g of PPV (75% strength solution in aliphatics) were initially introduced into a 2 l stirred glass pot having an anchor stirrer, reflux condenser and metering apparatuses. The initially introduced mixture was then heated to 70° C. at a stirrer speed of 200 rpm. After the internal temperature of 70° C. had been reached, the metering of initiator (57.22 g of ethyl acetate and 8.14 g of PPV (75% strength solution in aliphatics)) was started at a rate of 14.25 ml/h. Ten minutes after the start of the metering of the initiator, the monomer metering (95.36 g of vinyl acetate) was started at a rate of 25.64 ml/h. The metering of initiator extended over a period of 310 minutes, and the monomer metering ran for 240 minutes. After the end of the meterings, postpolymerization was effected for a further 60 minutes at 70° C. The polymer solution obtained was then completely evaporated down, i.e. the solvent was completely removed. A hydrophilic organofunctional silicone copolymer remained behind in the form of a turbid, slightly transparent oil.

Analyses of the hydrophilic organofunctional silicone copolymer (pure form): Solids content: 99.8%, DSC measurement: no melting point/crystallization point, glass transition temperature Tg=−55.9° C.; weight average molecular weight from GPC: $M_w$=18,700 g/mol.

1H-NMR spectroscopy: No free double bonds were detectable. The composition of the hydrophilic organofunctional silicone copolymer determined with the aid of NMR corresponded within the accuracy of measurement to the composition of the starting materials. Properties of an aqueous solution of the hydrophilic organofunctional silicone copolymer: solids content: 28.1%; colloidal turbid solution; Brookfield viscosity 20 (spindle 2): 20 mPa·s; mean particle size (Nanosizer): 126 nm; Coulter: Dn 0.074 µm; Dv 0.100 µm; surface area 67.5 $m^2$;
Static surface tension σ of a 1% strength aqueous solution: 28.8 mN/m.

EXAMPLE 4

733.36 g of ethyl acetate, 118.16 g of isopropanol, 153.21 g of polyglycol ether polyoxyalkylene polyether having 20 EO and 20 PO groups and functionalized with a terminal allyl group, 25.55 g of vinyl acetate, 76.6 g of α,ω-divinyl-functionalized polydimethylsiloxane having about 100 SiOMe$_2$ repeating units and 2.04 g of PPV (75% strength solution in aliphatics) were initially introduced into a 2 l stirred glass pot having an anchor stirrer, reflux condenser and metering apparatuses. The initially introduced mixture was then heated to 70° C. at a stirrer speed of 200 rpm. After the internal temperature of 70° C. had been reached, the metering of initiator (57.45 g of ethyl acetate and 8.17 g of PPV (75% strength solution in aliphatics) was started at a rate of 14.31 ml/h. Ten minutes after the start of the metering of the initiator, the monomer metering (127.66 g of vinyl acetate) was started at a rate of 34.32 ml/h. The metering of initiator extended over a period of 310 minutes, and the monomer metering ran for 240 minutes. After the end of the meterings, postpolymerization was effected for a further 60 minutes at 70° C. The polymer solution obtained was then completely evaporated down, i.e. the solvent was completely removed. A hydrophilic organofunctional silicone copolymer remained behind in the form of a turbid oil.

Analyses of the hydrophilic organofunctional silicone copolymer (pure form): Solids content: 99.9%, DSC measurement: no melting point/crystallization point, glass transition temperature Tg=−49.6° C.; weight average molecular weight from GPC: $M_w$=14,400 g/mol.

1H-NMR spectroscopy: No free double bonds were detectable. The composition of the hydrophilic organofunctional silicone copolymer determined with the aid of NMR corresponded within the accuracy of measurement to the composition of the starting materials. Properties of an aqueous solution of the hydrophilic organofunctional silicone copolymer: solids content: 28.8%; colloidal turbid solution; Brookfield viscosity 20 (spindle 2): 24 mPa·s; mean particle size (Nanosizer): 165 nm; Coulter: Dn 0.088 µm; Dv 0.138 µm; surface area 50.3 $m^2$;
Static surface tension σ of a 1% strength aqueous solution: 29.7 mN/m.

EXAMPLE 5

721.49 g of ethyl acetate, 116.25 g of isopropanol, 301.45 g of polyglycol ether polyoxyalkylene polyether having 20 EO and 20 PO groups and functionalized with a terminal allyl group, 75.36 g of α,ω-divinyl-functionalized polydimethylsiloxane having about 133 SiOMe2 repeating units and 2.01 g of PPV (75% strength solution in aliphatics) were initially introduced into a 2 l stirred glass pot having an anchor stirrer, reflux condenser and metering apparatuses. The initially introduced mixture was then heated to 70° C. at a stirrer speed of 200 rpm. After the internal temperature of 70° C. had been reached, the metering of initiator (56.52 g of ethyl acetate and 8.04 g of PPV (75% strength solution in aliphatics)) was started at a rate of 14.07 ml/h. The metering of initiator extended over a period of 310 minutes. After the end of the meterings, postpolymerization was effected for a further 60 minutes at 70° C. The polymer solution obtained was then completely evaporated down, i.e. the solvent was completely removed. A hydrophilic organofunctional silicone copolymer remained behind in the form of a turbid oil (slight transparency).

Analyses of the hydrophilic organofunctional silicone copolymer (pure form): Solids content: 99.7%, DSC measurement: no melting point/crystallization point, glass transition temperature Tg=−71.5° C.; weight average molecular weight from GPC: $M_w$=10,000 g/mol.

1H-NMR spectroscopy: The double bonds of the unsaturated silicone macromer were completely incorporated by polymerization. The composition of the hydrophilic organofunctional silicone copolymer determined with the aid of NMR corresponded within the accuracy of measurement to the composition of the starting materials. Properties of an aqueous solution of the hydrophilic organofunctional silicone copolymer: solids content: 28.6%; milky turbid solution; Brookfield viscosity 20 (spindle 2): 17 mPa·s; mean particle size (Nanosizer): 247 nm; Coulter: Dn 0.118 μm; Dv 1.178 μm; surface area 17.9 m$^2$;

Static surface tension σ of a 1% strength aqueous solution: 34.6 mN/m.

Remark: Stable solution or dispersion; generally good solubility/dispersiblity in water.

EXAMPLE 6

667.39 g of ethyl acetate, 116.67 g of isopropanol, 245.82 g of polyglycol ether polyoxyalkylene polyether having 20 EO and 20 PO groups and functionalized with a terminal allyl group, 0.95 g of acrylic acid, 113.46 g of α,ω-divinyl-functionalized polydimethylsiloxane having about 133 SiOMe2 repeating units and 2.02 g of PPV (75% strength solution in aliphatics) were initially introduced into a 2 l stirred glass pot having an anchor stirrer, reflux condenser and metering apparatuses. The initially introduced mixture was then heated to 70° C. at a stirrer speed of 200 rpm. After the internal temperature of 70° C. had been reached, the metering of initiator (56.73 g of ethyl acetate and 8.07 g of PPV (75% strength solution in aliphatics) was started at a rate of 14.13 ml/h. Ten minutes after the start of the metering of the initiator, the monomer metering (17.96 g of acrylic acid and 56.73 g of ethyl acetate) was started at a rate of 20.01 ml/h. The metering of initiator extended over a period of 310 minutes, and the monomer metering ran for 240 minutes. After the end of the meterings, postpolymerization was effected for a further 60 minutes at 70° C. The polymer solution obtained was then completely evaporated down, i.e. the solvent was completely removed. A hydrophilic organofunctional silicone copolymer remained behind in the form of a turbid oil.

Analyses of the hydrophilic organofunctional silicone copolymer (pure form): Solids content: 99.8%, DSC measurement: no melting point/crystallization point, glass transition temperature Tg=−68.2° C.; weight average molecular weight from GPC: $M_w$=17,500 g/mol.

1H-NMR spectroscopy: No free double bonds were detectable. The composition of the hydrophilic organofunctional silicone copolymer determined with the aid of NMR corresponded within the accuracy of measurement to the composition of the starting materials. Properties of an aqueous solution of the hydrophilic organofunctional silicone copolymer: solids content: 25.2%; colloidal slightly turbid solution; Brookfield viscosity 20 (spindle 2): 15 mPa·s; mean particle size (Nanosizer): 135 nm; Coulter: Dn 0.090 μm; Dv 0.117 μm; surface area 67.9 m$^2$;

Static surface tension σ of a 1% strength aqueous solution: 38.6 mN/m.

Remark: Stable solution or dispersion; generally very good solubility/dispersibility in water.

EXAMPLE 7

The procedure was as in example 6, except that, instead of acrylic acid, the same amount of diallyldimethylammonium chloride (DADMAC) was used in the form of a 64% strength solution in water.

A hydrophilic organofunctional silicone copolymer remained behind in the form of a turbid oil.

Analysis of the hydrophilic organofunctional silicone copolymer (pure form): Solids content: 99.7%, DSC measurement: no melting point/crystallization point, glass transition temperature Tg=−71.5° C.; weight average molecular weight from GPC: $M_w$=21,600 g/mol.

Properties of an aqueous solution of the hydrophilic organofunctional silicone copolymer: Solids content: 30.0%; colloidal turbid solution; Brookfield viscosity 20 (spindle 2): 16 mPa·s; mean particle size (Nanosizer): 301 nm; Coulter: Dn 0.267 μm; Dv 0.443 μm; surface area 67.9 m$^2$;

Static surface tension σ of a 1% strength aqueous solution: 16.7 mN/m.

Remark: Stable solution or dispersion; generally very good solubility/dispersibility in water.

EXAMPLE 8

842.92 g of ethyl acetate, 131.52 g of isopropanol, 198.7 g of polyglycol ether polyoxyalkylene polyether having 20 EO and 20 PO groups and functionalized with a terminal allyl group, 24.84 g of α,ω-divinyl-functionalized polydimethylsiloxane having about 177 SiOMe$_2$ repeating units and 1.32 g of PPV (75% strength solution in aliphatics) were initially introduced into a 2 l stirred glass pot having an anchor stirrer, reflux condenser and metering apparatuses. The initially introduced mixture was then heated to 70° C. at a stirrer speed of 200 rpm. After the internal temperature of 70° C. had been reached, the metering of initiator (37.26 g of ethyl acetate and 5.30 g of PPV (75% strength solution in aliphatics)) was started at a rate of 9.28 ml/h. T minutes after the start of the metering of the initiator, the monomer metering (24.84 g of α,ω-divinyl-functionalized polydimethylsiloxane having about 177 SiOMe$_2$ repeating units) was started at a rate of 8.28 ml/h. The metering of initiator extended over a period of 310 minutes, and the monomer metering ran for 180 minutes. After the end of the meterings, postpolymerization was effected for a further 60 minutes at 70° C. The polymer solution obtained was then completely evaporated down, i.e. the solvent was completely removed. A hydrophilic organofunctional silicone copolymer remained behind in the form of an almost transparent oil.

Analyses of the hydrophilic organofunctional silicone copolymer (pure form): Solids content: 99.9%, DSC measurement: no melting point/crystallization point, glass transition temperature Tg=−71.4° C.; weight average molecular weight from GPC: $M_w$=11,200 g/mol.

1H-NMR spectroscopy: No free double bonds were detectable. The composition of the hydrophilic organofunctional silicone copolymer determined with the aid of NMR corresponded within the accuracy of measurement to the composition of the starting materials. Properties of an aqueous solution of the hydrophilic organofunctional silicone copolymer: solids content: 28.4%; almost transparent solution (minimum colloidal turbidity); Brookfield viscosity 20 (spindle 2): 19 mPa·s; mean particle size (Nanosizer): 168 nm; Coulter: Dn 0.082 μm; Dv 0.13 μm; surface area 54.3 m².

Static surface tension σ of a 1% strength aqueous solution: 34.5 mN/m.

Remark: Stable solution or dispersion; generally very good solubility/dispersibility in water.

EXAMPLE 9

32.99 g of butyraldehyde, 577.37 g of polyglycol ether polyoxyalkylene polyether having 20 EO and 20 PO groups and functionalized with a terminal allyl group, 49.49 g of α,ω-divinyl-functionalized polydimethylsiloxane having about 133 SiOMe₂ repeating units, 4.12 g of vinyl acetate and 2.20 g of PPV (75% strength solution in aliphatics) were initially introduced into a stirred 2 l glass pot having an anchor stirrer, reflux condenser and metering apparatuses. The initially introduced mixture was then heated to 70° C. at a stirrer speed of 200 rpm. After the internal temperature of 70° C. had been reached, the metering of the initiator (19.8 g of PPV (75% strength solution in aliphatics)) was started at a rate of 4.89 ml/h. Ten minutes after the start of the metering of the initiator, monomer metering 1 (197.96 g of α,ω-divinyl-functionalized polydimethylsiloxane having about 133 SiOMe₂ repeating units) was started at a rate of 68.03 ml/h and monomer metering 2 (49.49 g of butyraldehyde and 37.12 g of vinyl acetate) was started at a rate of 34.37 ml/h. The metering of the initiator extended over a period of 300 minutes, and the two monomer meterings ran for 180 minutes. After the end of the metering of the initiator, postpolymerization was effected for a further 60 minutes at 70° C. Finally, distillation was effected in vacuo in order to expel the volatile fractions—such as the stabilizer of the initiator. The hydrophilic organofunctional silicone copolymer remained behind in the form of a turbid oil.

Analyses of the hydrophilic organofunctional silicone copolymer (pure form): Solids content: 99.8%, DSC measurement: no melting point/crystallization point, glass transition temperature Tg=−67.8° C.; weight average molecular weight from GPC: $M_w$=15,900 g/mol.

1H-NMR spectroscopy: No free double bonds were detectable. The composition of the hydrophilic organofunctional silicone copolymer determined with the aid of NMR corresponded within the accuracy of measurement to the composition of the starting materials. The solubility in water was not investigated.

EXAMPLE 10

344.39 g of ethyl acetate, 69.14 g of isopropanol, 51.36 g of polyglycol ether polyoxyalkylene polyether having 20 EO and 20 PO groups and functionalized with a terminal allyl group, 15.80 g of α,ω-divinyl-functionalized polydimethylsiloxane having about 177 SiOMe₂ repeating units, 11.85 g of vinyl acetate and 4.21 g of PPV (75% strength solution in aliphatics) were initially introduced into a stirred 2 l glass pot having an anchor stirrer, reflux condenser and metering apparatuses. The initially introduced mixture was then heated to 70° C. at a stirrer speed of 200 rpm. After the internal temperature of 70° C. had been reached, the metering of the initiator (118.53 g of ethyl acetate and 16.86 g of PPV (75% strength solution in aliphatics)) was started at a rate of 29.51 ml/h. Ten minutes after the start of the metering of the initiator, monomer metering 1 (142.23 g of α,ω-divinyl-functionalized polydimethylsiloxane having about 177 SiOMe₂ repeating units and 106.68 g of vinyl acetate) was started at a rate of 64.24 ml/h and monomer metering 2 (462.26 g of polyglycol ether having 20 EO and 20 PO groups and functionalized with a terminal allyl group) was started at a rate of 115.56 ml/h. The metering of the initiator extended over a period of 310 minutes, and the two monomer meterings ran for 240 minutes. After the end of the metering of the initiator, postpolymerization was effected for a further 60 minutes at 70° C. The polymer solution obtained was then completely evaporated down, i.e. the solvent was completely removed. A hydrophilic organofunctional silicon copolymer remained behind in the form of a slightly turbid oil.

Analyses of the hydrophilic organofunctional silicone copolymer (pure form): Solids content: 99.8%, DSC measurement: no melting point/crystallization point, glass transition temperature Tg=−67.0° C.; weight average molecular weight from GPC: $M_w$=21,400 g/mol.

1H-NMR spectroscopy: No free double bonds were detectable. The composition of the hydrophilic organofunctional silicone copolymer determined with the aid of NMR corresponded within the accuracy of measurement to the composition of the starting materials.

The invention claimed is:

1. The process for the preparation of liquid hydrophilic organofunctional silicone copolymer, comprising free radical polymerizing from 10 to 45 weight percent of a silicone macromer a) of the formula

in which R are identical or different and are monovalent, optionally substituted alkyl or alkoxy radicals having 1 to 18 C atoms, $R^1$ is a ethylenically unsaturated polymerizable group, a is 1, and n is from 5 to 10,000; with 50 to 80% by weight of one or more polyethers b) having 3 to 1000 oxyalkylene repeating units selected from the group consisting of oxyethylene, oxypropylene, oxybutylene, and mixtures thereof, the polyether bearing at least one unsaturated group selected from the group consisting of vinyl, allyl, acryloyl, and methacryloyl at terminal position(s) of the polyether; and optionally, from 10 to 30% by weight of at least one unsaturated monomer c) different from a) and b), selected from the group consisting of vinyl esters of straight-chain or branched alkylcarboxylic acids having 1 to 15 C atoms, (meth)acrylates of alcohols having 1 to 15 C atoms, (meth)acrylamides, vinylaromatics, olefins, vinyl halides, vinyl ketones, vinyl ethers, polymerizable silanes, unsaturated mono- and dicarboxylic acids or salts thereof, ethylenically unsaturated carboxamides and carbonitriles, mono- and diesters of fumaric and maleic acid, ethylenically unsaturated sulfonic acids or salts thereof, ethylenically unsaturated phosphorus-containing monomers, and cationic monomers, the weight percentages being based on the total weight of a), b), and c), and totaling 100% by weight.

2. The process of claim 1, wherein the polyethers are selected from the group consisting of polyoxyethylene glycol divinyl ether, polyoxyethylene glycol diallyl ether, polyoxypropylene glycol divinyl ether, polyoxypropylene glycol diallyl ether, polyoxyethylene glycol di(meth)acrylate, polyoxypropylene glycol di(meth)acrylate, polyoxyethylene glycol monovinyl ether, polyoxyethylene glycol monoallyl ether, polyoxyethylene glycol monoacrylate, polyoxyethylene glycol monomethacrylate, polyoxypropylene glycol monoacrylate, polyoxypropylene glycol monomethacrylate, polyoxyethylenepolyoxypropylene glycol monovinyl ether, polyoxyethylene-polyoxypropylene glycol monoallyl ether, polyoxyethylenepolyoxypropylene glycol monoacrylate, and polyoxyethylenepolyoxypropylene glycol monomethacrylate.

3. The process of claim 1, wherein the ethylenically unsaturated monomer c) is present, and comprises one or more monomers selected from the group consisting of vinyl acetate, hydroxyethylacrylate, glycidyl methacrylate, and acrylic acid.

4. The process of claim 1, further comprising preparing an aqueous emulsion of the hydrophilic organofunctional silicone copolymer by solvent exchange with water.

5. The process of claim 1, wherein in the silicone macromers R is methyl, methoxy, or ethoxy.

6. The process of claim 1, wherein $R^1$ is vinyl or methacryloylpropyl.

7. The process of claim 1, wherein the polymerization is effected by one or more free radical initiators selected from the group consisting of tert-butyl peroxy-2-ethylhexanoate, tert-butyl peroxypivalate, tert-butyl peroxyneodecanoate, dibenzoyl peroxide, tert-amyl peroxypivalate, di(2-ethylhexyl) peroxydicarbonate, 1,1-bis(tert-butylperoxy)-3,3,5-trimethylcyclohexane, and di(4-tert-butylcyclohexyl) peroxydicarbonate azo initiators.

* * * * *